United States Patent
Ogasawara

(10) Patent No.: US 12,031,621 B2
(45) Date of Patent: Jul. 9, 2024

(54) TRANSMISSION LUBRICATING STRUCTURE OF HELICOPTER

(71) Applicant: KAWASAKI JUKOGYO KABUSHIKI KAISHA, Kobe (JP)

(72) Inventor: Kenta Ogasawara, Akashi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 77 days.

(21) Appl. No.: 17/277,424

(22) PCT Filed: Sep. 19, 2019

(86) PCT No.: PCT/JP2019/036720
§ 371 (c)(1),
(2) Date: Mar. 18, 2021

(87) PCT Pub. No.: WO2020/059786
PCT Pub. Date: Mar. 26, 2020

(65) Prior Publication Data
US 2022/0034396 A1    Feb. 3, 2022

(30) Foreign Application Priority Data

Sep. 21, 2018  (JP) ................................ 2018-176773

(51) Int. Cl.
*F16H 57/04* (2010.01)
(52) U.S. Cl.
CPC ..... *F16H 57/0442* (2013.01); *F16H 57/0435* (2013.01)
(58) Field of Classification Search
CPC ............... F16H 57/043; F16H 57/0435; F16H 57/0441; F16H 57/0442; F16H 57/045;
(Continued)

(56) References Cited

U.S. PATENT DOCUMENTS

| | | | |
|---|---|---|---|
| 4,717,000 A | * | 1/1988 | Waddington ........ F16C 33/6662 384/473 |
| 5,029,672 A | * | 7/1991 | Witczak .................. F16N 7/385 184/7.4 |

(Continued)

FOREIGN PATENT DOCUMENTS

JP  2007-8461 A  1/2007

OTHER PUBLICATIONS

International Search Report for PCT/JP2019/036720 dated Nov. 19, 2019 (PCT/ISA/210).

*Primary Examiner* — Minh Truong
(74) *Attorney, Agent, or Firm* — Sughrue Mion, PLLC

(57) ABSTRACT

A transmission lubricating structure includes: a main tank; an auxiliary tank; a common line to supply lubricating oil from the main or the auxiliary tank; a main line to introduce the lubricating oil in the main tank to the common line; an auxiliary line to introduce the lubricating oil in the auxiliary tank to the common line; a common nozzle configured to discharge the lubricating oil, supplied from the common line, to a transmission; a pump configured to supply the lubricating oil from the main tank to the common line; and a relay valve arranged lower than the auxiliary tank and higher than the common nozzle and provided upstream of the common line, the relay valve being configured to block the auxiliary line when the pump is operating and open the auxiliary line so the common line communicates with the auxiliary tank when the pump is in a stop state.

4 Claims, 2 Drawing Sheets

(58) Field of Classification Search
CPC ...... F16H 57/0471; F16N 7/02; F16K 17/025; F16K 17/0406; F16K 17/12
See application file for complete search history.

(56) References Cited

U.S. PATENT DOCUMENTS

| | | |
|---|---|---|
| 10,012,305 B2 * | 7/2018 | Louis .................. F16H 57/0442 |
| 2009/0071753 A1 | 3/2009 | Carnelli et al. |
| 2012/0012771 A1 * | 1/2012 | Korkmaz .............. F16K 15/044 |
| | | 251/315.07 |
| 2013/0133454 A1 * | 5/2013 | Barthel .................. F03D 80/70 |
| | | 74/468 |
| 2016/0363208 A1 | 12/2016 | Louis |

* cited by examiner

TRANSMISSION LUBRICATING STRUCTURE OF HELICOPTER

CROSS REFERENCE TO RELATED APPLICATIONS

This application is a National Stage of International Application No. PCT/JP2019/036720 filed Sep. 19, 2019, claiming priority based on Japanese Patent Application No. 2018-176773 filed Sep. 21, 2018.

TECHNICAL FIELD

The present invention relates to a transmission lubricating structure of a helicopter.

BACKGROUND ART

A lubricating system of a transmission of a helicopter is required to have a continuously operating ability in emergency. In recent years, further improvement of the continuously operating ability is required. Therefore, proposed is a configuration in which: an auxiliary lubricating circuit is provided separately from a main lubricating circuit; and a transmission is lubricated by the auxiliary lubricating circuit in emergency of the main lubricating circuit (see PTL 1, for example).

CITATION LIST

Patent Literature

PTL 1: Japanese Laid-Open Patent Application Publication No. 2007-8461

SUMMARY OF INVENTION Technical Problem

However, according to the configuration of PTL 1, since the auxiliary lubricating circuit needs to exist independently from the main lubricating circuit, the number of parts increases, and the degree of freedom of the design of the transmission deteriorates in order to secure an arrangement space for the auxiliary lubricating circuit.

An object of the present invention is to, in a configuration in which a main lubricating circuit and an auxiliary lubricating circuit are provided at a transmission of a helicopter, suppress an increase in the number of parts and improve the degree of freedom of the design of the transmission.

Solution to Problem

A transmission lubricating structure of a helicopter according to one aspect of the present invention includes: a main tank in which lubricating oil is stored; an auxiliary tank in which the lubricating oil is stored; a common line arranged lower than the auxiliary tank and supplied with the lubricating oil from the main tank or the auxiliary tank; a common nozzle provided downstream of the common line and configured to discharge the lubricating oil, supplied from the common line, to a transmission; a main line through which the lubricating oil in the main tank is introduced to the common line; an auxiliary line through which the lubricating oil in the auxiliary tank is introduced to the common line; a pump configured to supply the lubricating oil by pressure from the main tank to the common line; and a relay valve arranged lower than the auxiliary tank and higher than the common nozzle and provided upstream of the common line, the relay valve being configured to block the auxiliary line when the pump is operating and open the auxiliary line to make the common line communicate with the auxiliary tank when the pump is in stop state.

According to the above configuration, in normal time in which the pump is operating, the relay valve blocks a passage between the common line and the auxiliary tank. Therefore, not the lubricating oil in the auxiliary tank but the lubricating oil supplied by pressure by the pump from the main tank flows through the common line and is then discharged from the common nozzle. On the other hand, in emergency in which the pump is in a stop state, the relay valve makes the common line communicate with the auxiliary tank. Therefore, the lubricating oil in the auxiliary tank flows through the common line by the own weight and is then discharged from the common nozzle. Therefore, while appropriately securing the continuously operating ability of the lubricating system in emergency, the common line and the common nozzle are used both in normal time and in emergency. Thus, an increase in the number of parts can be suppressed, and the degree of freedom of the design of the transmission can be improved.

The transmission lubricating structure may further include: a supply line through which the lubricating oil in the main line is introduced to the auxiliary tank; and a flow resistance portion provided at the supply line.

According to the above configuration, in normal time in which the pump is operating, the lubricating oil supplied by pressure by the pump from the main tank can be supplied through the auxiliary line to the auxiliary tank, and while maintaining the hydraulic pressure in the main line by a flow resistance unit (for example, a restrictor), the lubricating oil can be supplied to the auxiliary tank.

The relay valve may be a check valve configured to allow flow from the auxiliary tank to the common line.

According to the above configuration, it is possible to easily realize the configuration in which: the passage between the common line and the auxiliary tank is blocked when the pump is operating; and the common line is made to communicate with the auxiliary tank when the pump is in a stop state.

The relay valve may be a switching valve including a first inflow port, a second inflow port, and an outflow port. The main line may be connected to the first inflow port. The auxiliary line may be connected to the second inflow port. The common line may be connected to the outflow port. The switching valve may make the first inflow port communicate with the outflow port by pressure of the lubricating oil supplied by pressure from the pump. When the pump is in a stop state, the switching valve may make the second inflow port communicate with the outflow port by own weight of the lubricating oil in the auxiliary tank.

According to the above configuration, when the pump is operating, the common line communicates with the main line through the switching valve by the pressure of the lubricating oil supplied by pressure by the pump, and not the lubricating oil in the auxiliary tank but the lubricating oil in the main tank flows through the common line and is then discharged from the common nozzle. On the other hand, when the pump is in a stop state, the hydraulic pressure generated by the pump is not applied to the switching valve. Therefore, the common line communicates with the auxiliary line through the switching valve by the own weight of the lubricating oil in the auxiliary tank, and the lubricating oil in the auxiliary tank flows through the common line by the own weight and is then discharged from the common nozzle.

Advantageous Effects of Invention

According to the present invention, in a configuration in which a main lubricating circuit and an auxiliary lubricating circuit are provided at a transmission of a helicopter, an increase in the number of parts can be suppressed, and the degree of freedom of the design of the transmission can be improved.

DESCRIPTION OF EMBODIMENTS

Hereinafter, embodiments will be described with reference to the drawings.

Embodiment 1

Figure 1:
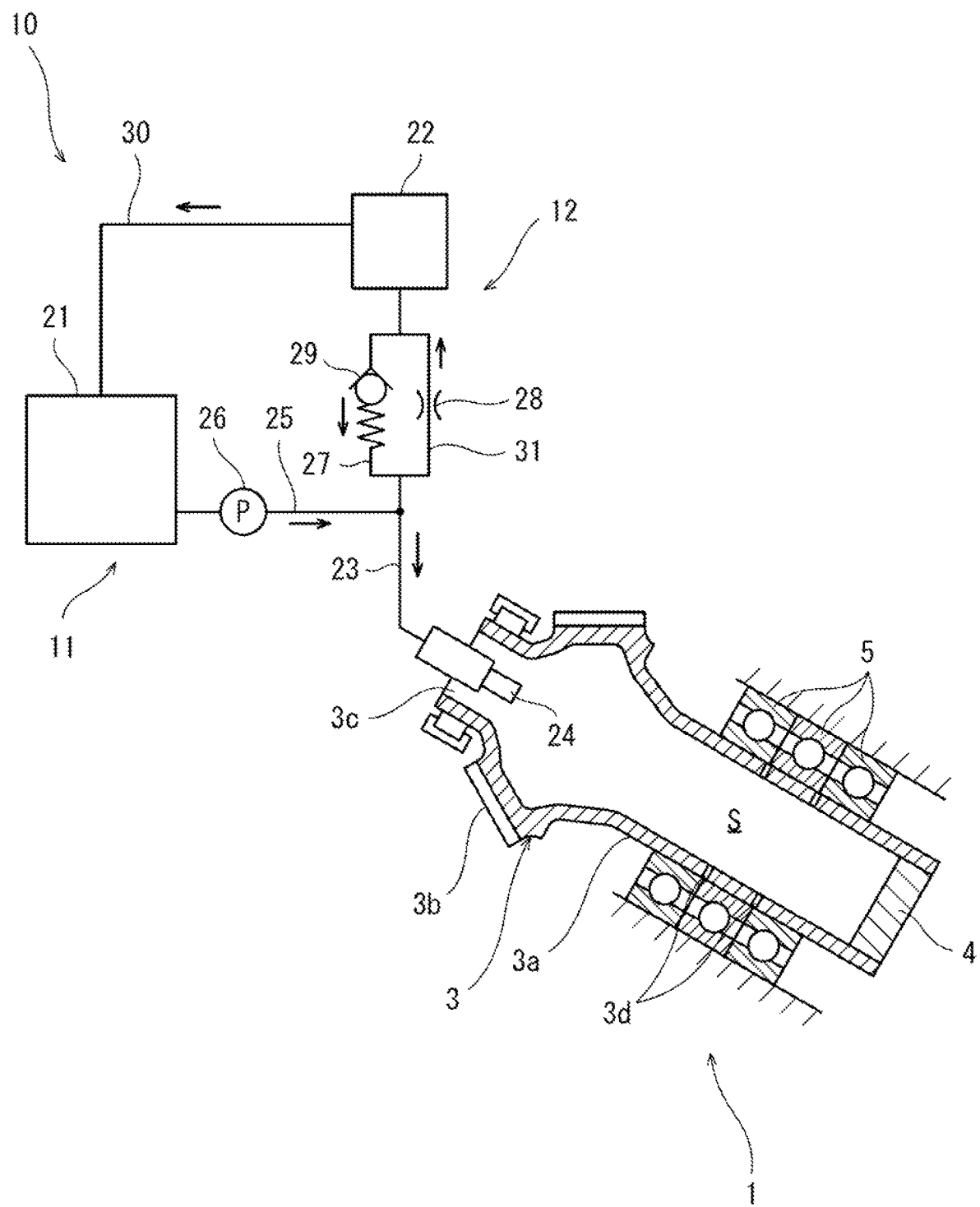
FIG. 1 is a diagram showing a transmission lubricating structure of a helicopter according to Embodiment 1.

As shown in FIG. 1, a helicopter includes a transmission 1 configured to transmit power from a prime mover (for example, a turbine) to a rotary wing. The transmission 1 includes a power transmitting shaft 3 which is connected to the prime mover so as to be able to transmit power to the prime mover. The power transmitting shaft 3 of the present embodiment is arranged in such a posture as to be inclined relative to a horizontal direction and a vertical direction. However, the power transmitting shaft 3 may be arranged so as to extend in an upper-lower direction or a horizontal direction. Since the transmission 1 needs to be appropriately lubricated by a lubricating liquid during operation, the helicopter includes a transmission lubricating structure 10.

The power transmitting shaft 3 is, for example, a hollow shaft including a shaft portion 3a and a bevel gear portion 3b provided at an upper end side of the shaft portion 3a. The shaft portion 3a of the power transmitting shaft 3 is inserted into a plurality of bearings 5 (for example, ball bearings). The bearings 5 are adjacently arranged so as to be lined up in a substantially upper-lower direction. A plug 4 is provided at a lower end of the power transmitting shaft 3. The plug 4 closes an internal space S of the power transmitting shaft 3 from a lower side. It should be noted that instead of the plug, a baffle plate including holes which delay the discharge of lubricating oil from the internal space S may be provided at the lower end of the power transmitting shaft 3. An upper opening portion 3c through which the internal space S of the power transmitting shaft 3 is open upward is formed at an upper end of the power transmitting shaft 3. Ejection holes 3d through which the internal space S communicates with an outside are formed at the shaft portion 3a of the power transmitting shaft 3. The ejection holes 3d are directed to the bearings 5.

The transmission lubricating structure 10 includes a main tank 21, an auxiliary tank 22, a common line 23, a common nozzle 24, a main line 25, a pump 26, an auxiliary line 27, a check valve 29 (relay valve), a supply line 31, an orifice 28 (flow resistance portion), and a discharge line 30.

The main tank 21 and the auxiliary tank 22 store the lubricating oil. The common line 23 is arranged lower than the auxiliary tank 22. The lubricating oil is supplied to the common line 23 from the main tank 21 or the auxiliary tank 22. The common nozzle 24 is provided downstream of the common line 23. The common nozzle 24 discharges the lubricating oil, supplied from the common line 23, to a lubrication target of the transmission 1.

In the present embodiment, as one example, the common nozzle 24 discharges the lubricating liquid through the opening portion 3c of the power transmitting shaft 3 into the internal space S of the power transmitting shaft 3. With this, the lubricating liquid in the internal space S of the power transmitting shaft 3 is ejected through the ejection holes 3d to the outside by the centrifugal force of the rotation of the power transmitting shaft 3. Thus, the bearings 5 are lubricated.

The main line 25 connects the main tank 21 to the common line 23. The pump 26 supplies the lubricating oil by pressure from the main tank 21 through the main line 25 to the common line 23. For example, an electric pump may be used as the pump 26. However, another type of pump may be used.

The auxiliary line 27 connects the auxiliary tank 22 to the common line 23. The check valve 29 is provided at the auxiliary line 27. The supply line 31 connects the auxiliary tank 22 to the common line 23. The orifice 28 is provided at the supply line 31. In the present embodiment, the auxiliary line 27 and the supply line 31 are arranged in parallel with each other. Moreover, the auxiliary line 27 and the supply line 31 join at a portion connected to the auxiliary tank 22 and a portion connected to the common line 23 to be integrated with each other.

The orifice 28 restricts the flow rate of the lubricating oil flowing from the main line 25 to the auxiliary tank 22 and applies resistance to the flow of the lubricating oil. The check valve 29 is arranged in parallel with the orifice 28. The check valve 29 allows the flow from the auxiliary tank 22 to the common line 23 and blocks the flow from the common line 23 and the main line 25 to the auxiliary tank 22. The check valve 29 serves as a relay valve which blocks the auxiliary line 27 when the pump 26 is operating and opens the auxiliary line 27 to make the common line 23 communicate with the auxiliary tank 22 when the pump 26 is in a stop state.

The check valve 29 is provided upstream of the common line 23 so as to be arranged lower than the auxiliary tank 22 and higher than the common nozzle 24. In the example of FIG. 1, the check valve 29 is provided at the auxiliary line 27. However, the check valve 29 may be provided at a joining point where the common line 23 and the main line 25 join each other.

As above, the main tank 21, the pump 26, the main line 25, the common line 23, and the common nozzle 24 constitute a main lubricating circuit 11, and the auxiliary tank 22, the auxiliary line 27, the supply line 31, the orifice 28, the check valve 29, the common line 23, and the common nozzle 24 constitute an auxiliary lubricating circuit 12.

In normal time in which the pump 26 is operating, the lubricating oil supplied by pressure by the pump 26 from the main tank 21 through the main line 25 is introduced through the common line 23 to the common nozzle 24 and is discharged toward the internal space S of the power transmitting shaft 3. The lubricating liquid in the internal space S is ejected through the ejection holes 3d to the bearings 5 by the rotation of the power transmitting shaft 3. At this time, the check valve 29 is closed by the pressure of the lubricating oil supplied by pressure by the pump 26, and part of the lubricating oil supplied by pressure through the main line 25 flows through the orifice 28 to be stored in the auxiliary tank 22.

To be specific, since the check valve 29 blocks the flow from the common line 23 to the auxiliary tank 22, not the lubricating oil from the auxiliary tank 22 but the lubricating oil supplied by pressure by the pump 26 from the main tank 21 flows through the common line 23 to be discharged from the common nozzle. The lubricating oil which has exceeded a capacity upper limit of the auxiliary tank 22 is discharged through the discharge line 30 to be returned to the main tank 21.

In emergency in which the pump 26 is in a stop state, since the hydraulic pressure generated by the pump 26 is not applied to the check valve 29, the check valve 29 is opened by the own weight of the lubricating oil in the auxiliary tank 22, and therefore, the common line 23 communicates with the auxiliary tank 22. Thus, the lubricating oil in the auxiliary tank 22 flows through the common line 23 by the own weight and is discharged through the common nozzle 24. Therefore, while appropriately securing a continuously operating ability of a lubricating system in emergency, the common line 23 and the common nozzle 24 are used both in normal time and in emergency. Thus, an increase in the number of parts can be suppressed, and the degree of freedom of the design of the transmission 1 can be improved.

Embodiment 2

Figure 2:
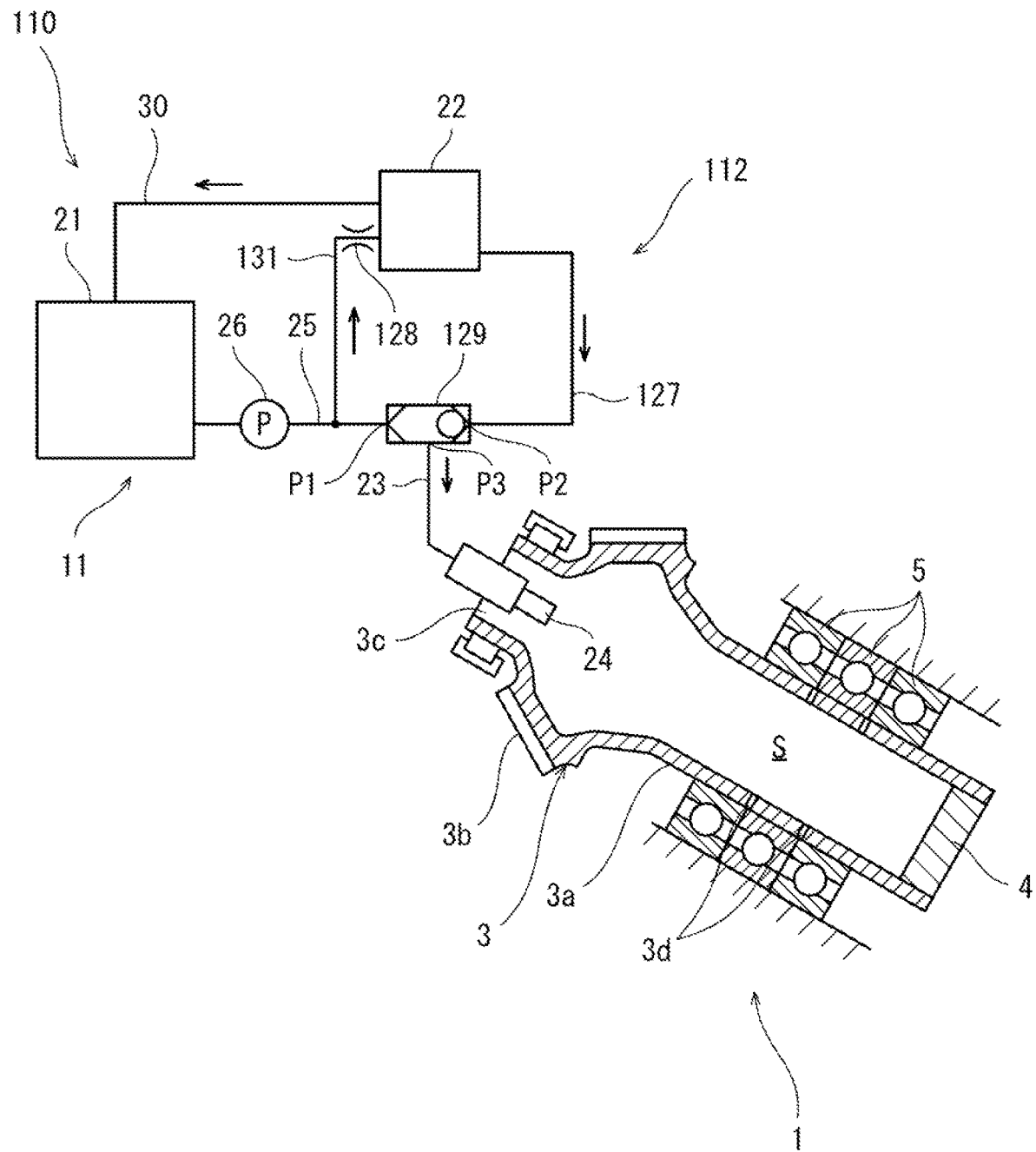
FIG. 2 is a diagram showing the transmission lubricating structure of the helicopter according to Embodiment 2.

As shown in FIG. 2, in a transmission lubricating structure 110 according to Embodiment 2, an orifice 128 is provided at a supply line 131 formed separately from an auxiliary line 127. It should be noted that the same reference signs are used for the same components as in Embodiment 1, and detailed explanations thereof are omitted. The transmission lubricating structure 110 includes the main tank 21, the auxiliary tank 22, the common line 23, the common nozzle 24, the main line 25, the pump 26, the supply line 131, the orifice 128 (flow resistance portion), the auxiliary line 127, a switching valve 129 (relay valve), and the discharge line 30.

The supply line 131 introduces the lubricating oil from the main line 25 to the auxiliary tank 22. In the present embodiment, the supply line 131 connects the auxiliary tank 22 to a portion of the main line 25 which portion is located at a discharge side of the pump 26. It should be noted that instead of the configuration in which the supply line 131 branches from the main line 25, the supply line 131 may directly connect the main tank 21 and the auxiliary tank 22 to each other. The orifice 128 is provided at the supply line 131. The orifice 128 restricts the flow rate of the lubricating oil flowing from the main line 25 through the supply line 131 to the auxiliary tank 22 and applies resistance to the flow of the lubricating oil.

The auxiliary line 127 introduces the lubricating oil from the auxiliary tank 22 to the the switching valve 129 in order to supply the lubricating oil to the common line 23. The switching valve 129 includes a first inflow port P1, a second inflow port P2, and an outflow port P3. A downstream end of the main line 25 is connected to the first inflow port P1. A downstream end of the auxiliary line 127 is connected to the second inflow port P2. An upstream end of the common line 23 is connected to the outflow port P3.

The switching valve 129 serves as a relay valve which makes the common line 23 communicate with the main tank 21 when the pump 26 is operating and makes the common line 23 communicate with the auxiliary tank 22 when the pump 26 is in a stop state. Specifically, the switching valve 129 is configured such that the pressure of the lubricating oil supplied from the pump 26 by pressure closes the second inflow port P2 and makes the first inflow port P1 communicate with the outflow port P3. To be specific, discharge pressure of the pump 26 is set such that even when the auxiliary tank 22 is fully filled with the lubricating liquid, the first inflow port P1 of the switching valve 129 is made to communicate with the outflow port P3.

Moreover, the switching valve 129 is configured such that when the pump 26 stops, and therefore, the hydraulic pressure is not applied to the first inflow port P1, the own weight of the lubricating oil in the auxiliary tank 22 closes the first inflow port P1 and makes the second inflow port P2 communicate with the outflow port P3. The switching valve 129 may be configured such that the second inflow port P2 is biased to communicate with the outflow port P3 such that the second inflow port P2 is normally open.

As above, the main tank 21, the pump 26, the main line 25, the switching valve 129, the common line 23, and the common nozzle 24 constitute a main lubricating circuit 111, and the auxiliary tank 22, the supply line 131, the orifice 128, the auxiliary line 127, the switching valve 129, the common line 23, and the common nozzle 24 constitute an auxiliary lubricating circuit 112. To be specific, the switching valve 129 is used in both the main lubricating circuit 111 and the auxiliary lubricating circuit 112.

In normal time in which the pump 26 is operating, the lubricating oil supplied by pressure by the pump 26 from the main tank 21 is supplied through the orifice 128 of the supply line 131 to the auxiliary tank 22, and the common line 23 communicates with the main line 25 through the switching valve 129 by the pressure of the lubricating oil supplied by pressure by the pump 26. With this, the amount of lubricating oil in the auxiliary tank 22 gradually increases, and not the lubricating oil in the auxiliary tank 22 but the lubricating oil in the main tank 21 flows through the common line 23 to be discharged from the common nozzle 24.

In emergency in which the pump stops, the hydraulic pressure generated by the pump 26 is not applied to the first inflow port P1 of the switching valve 129. Therefore, the second inflow port P2 communicates with the outflow port P3 in the switching valve 129 by the own weight of the lubricating oil in the auxiliary tank 22, and the common line 23 communicates with the auxiliary line. With this, the lubricating oil in the auxiliary tank 22 flows through the common line 23 by the own weight and is then discharged from the common nozzle 24.

The present invention is not limited to the above embodiments. Modifications, additions, and eliminations may be made with respect to the configurations of the embodiments. For example, the lubrication target is not limited to the bearing 5, and another portion (for example, a gear meshing surface) may be the lubrication target. In the example shown in FIG. 1, the auxiliary tank 22 is arranged at a position higher than the main tank 21. However, the auxiliary tank 22 is only required to be arranged at a position higher than the check valve 29 or the switching valve 129 and does not have to be arranged at a position higher than the main tank 21. In the above-described embodiments, the orifices 28 and 128 are described as the flow resistance portions. However, a restrictor constituted by a hole may be used, or a bent passage (for example, a zigzag passage or a labyrinth passage) may be used.

REFERENCE SIGNS LIST 1 transmission
10, 110 transmission lubricating structure
21 main tank
22 auxiliary tank 23 common line
24 common nozzle
25 main line
26 pump
27, 127 auxiliary line
27a first passage
27b second passage
28, 128 orifice (flow resistance portion)
29 check valve (relay valve)
129 switching valve (relay valve)
131 supply line
P1 first inflow port
P2 second inflow port
P3 outflow port

The invention claimed is:

1. A transmission lubricating structure of a helicopter, the transmission lubricating structure comprising:
a main tank in which lubricating oil is stored;
an auxiliary tank in which the lubricating oil is stored;
a common line arranged lower than the auxiliary tank and supplied with the lubricating oil from the main tank or the auxiliary tank;
a main line through which the lubricating oil in the main tank is introduced to the common line;
an auxiliary line through which the lubricating oil in the auxiliary tank is introduced to the common line;
a common nozzle provided downstream of the common line and configured to discharge the lubricating oil, supplied from the common line, to a transmission;
a pump configured to supply the lubricating oil by pressure from the main tank to the common line;
a relay valve arranged lower than the auxiliary tank and higher than the common nozzle and provided upstream of the common line;
a supply line through which the lubricating oil in the main line is introduced to the auxiliary tank; and
a resistance orifice that is provided at the supply line, and always fluidically connects the main line to the auxiliary tank; wherein
the relay valve is configured to:
block the auxiliary line when the pump is operating; and
open the auxiliary line by the own weight of the lubricating oil in the auxiliary tank and by decrease in hydraulic pressure applied from the pump to the relay valve to make the common line communicate with the auxiliary tank when the pump is in stop state.

2. The transmission lubricating structure according to claim 1, wherein the relay valve is a check valve configured to allow flow from the auxiliary tank to the common line.

3. The transmission lubricating structure according to claim 1, wherein:
the relay valve is a switching valve including a first inflow port, a second inflow port, and an outflow port;
the main line is connected to the first inflow port;
the auxiliary line is connected to the second inflow port;
the common line is connected to the outflow port;
the switching valve makes the first inflow port communicate with the outflow port by pressure of the lubricating oil supplied by pressure from the pump; and
when the pump is in a stop state, the switching valve makes the second inflow port communicate with the outflow port by own weight of the lubricating oil in the auxiliary tank.

4. The transmission lubricating structure according to claim 1, wherein
the relay valve is a check valve configured to allow flow from the auxiliary tank to the common line;
the auxiliary line and the supply line are arranged in parallel with each other;
the check valve is provided at the auxiliary line;
the resistance orifice is provided at the supply line;
the auxiliary line and the supply line join at a portion connected to the auxiliary tank to be integrated with each other; and
the auxiliary line and the supply line join at a portion connected to the common line to be integrated with each other.

* * * * *